July 12, 1966   H. T. DEAVER   3,260,149
ELONGATED EXPANSIBLE RESILIENT FASTENER
Filed Feb. 23, 1965
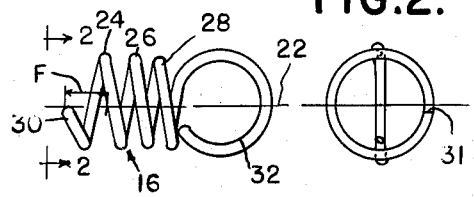
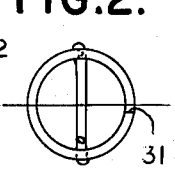
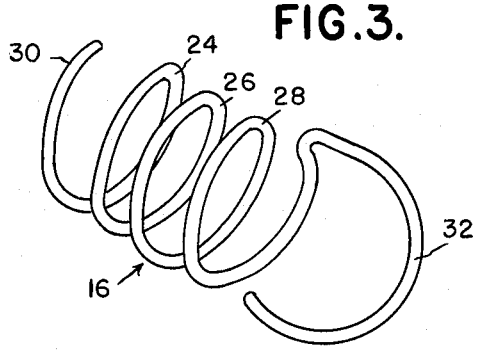
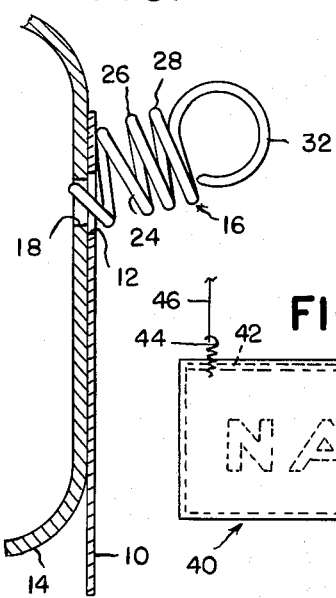
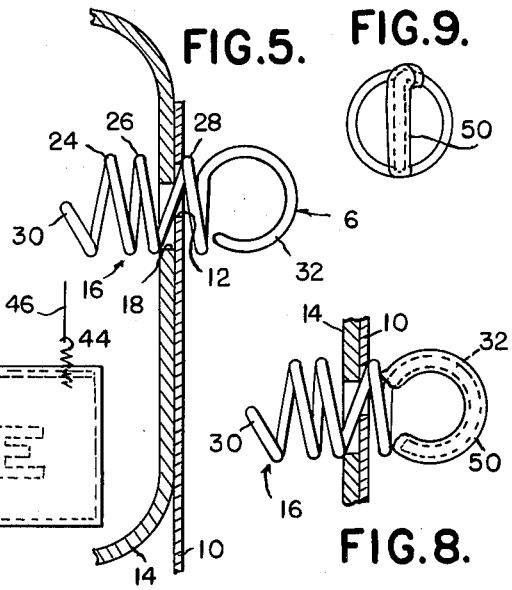
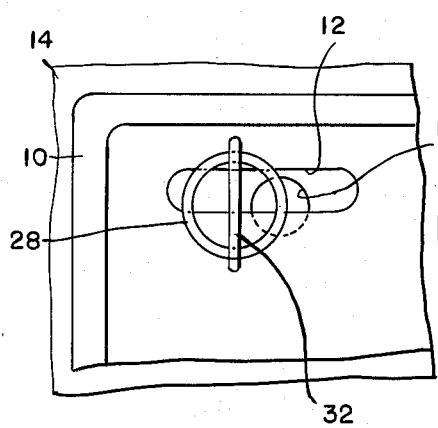
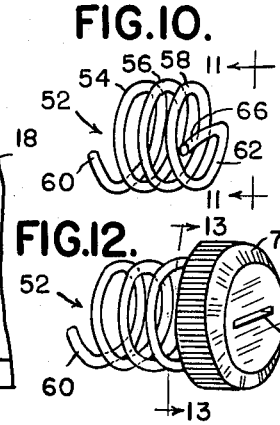
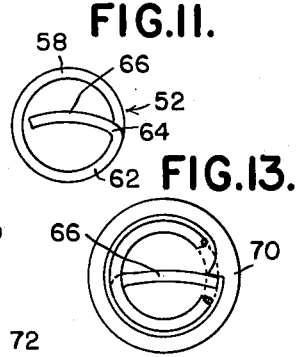
INVENTOR.
HAROLD T. DEAVER
BY
ATTORNEYS 3,260,149
ELONGATED EXPANSIBLE RESILIENT
FASTENER
Harold T. Deaver, 23470 Sherman, Oak Park, Mich.
Filed Feb. 23, 1965, Ser. No. 443,737
1 Claim. (Cl. 85—1)

The present invention is a continuation-in-part application of my copending application U.S. 206,960, now abandoned, filed July 2, 1962, which in turn is a continuation-in-part application of application U.S. 177,443, now abandoned, filed in the Patent Office on Mar. 5, 1962.

The present invention relates to an elongated expansible resilient fastener or holder which is adapted to connect a pair of members, elements, or the like. More particularly, this invention relates to a screw-spring holder which is adapted to be threaded into a pair of aligned holes provided in the members to connect the members and resiliently urge the members together.

The present invention is particularly adaptable for automobile sale agencies, including used car and new car dealers, where it is necessary to place a dealer's license plate on an automobile and remove the license plate from the automobile after a dealer has finished utilizing the automobile. Certain state laws require that a dealer's plate be placed on the bumper of an automobile in such a manner that it may be removably detached rapidly and with ease. In the past, various types of temporary mounting devices including magnets have been suggested. Certain other devices require the use of a threaded bolt and nut or the like. However, such constructions have certain disadvantages in present modern-day automobiles, since it is very difficult to place the nuts behind the bumpers, and the magnets and associated plates are easily lost during operation of the vehicle. In addition, a special tool, such as a screw driver, is required for threading the bolts. At times it is very difficult to remove the bolts, particularly when no tool is immediately available. Other resilient mounting devices for license plates have been utilized, but have not worked successfully, since they could not withstand road vibrations. As a result, dealer's plates were lost on many occasions.

The present invention has overcome this problem by providing a manually operable screw-spring holder for removably attaching the dealer's license plate to the bumper of an automobile. With such a construction the license plate is firmly held in place by the screw-spring holder which is capable of withstanding excessive road vibrations.

The screw-spring holder of the present invention is designed and engineered to fit all modern automobiles; holds a license plate absolutely secure; meets all standard and legal requirements; and may be attached or removed in less than thirty seconds.

It is an object of the present invention to provide an elongated expansible resilient fastener comprising a length of metal wire of circular cross-section wound in substantially helical form to provide a single continuous thread thereon, the wire having a main body portion consisting of a plurality of helically equally spaced convolutions and a pair of opposed end portions at the terminal points of the main body portion, the pitch of the convolutions of the main body portion being substantially equal, one of the end portions providing a guide for threading the fastener into an opening and the other of the end portions providing a handle of semi-circular configuration which lies in a plane containing the longitudinal axis of the fastener.

A further object of the present invention is to provide a fastener of the aforementioned type wherein an elongated tubular plastic element surrounds the other end portion forming the handle to provide a yieldable cover on the handle, the handle and the element being of semi-circular configuration, and the handle having a terminal extermity spaced axially from the convolution nearest the handle and curving towards the longitudinal axis of the fastener to permit the tubular plastic element to be sleeved on the handle without flexing the handle under a force sufficient to urge the leading end of the plastic element into pressure engagement with the convolution closest to the handle and to thereafter urge the trailing end of the plastic element against the convolution closest to the handle to lock the plastic element on the handle thereby preventing lengthwise movement of the plastic element on the handle.

A still further object of the present invention is to provide a fastener of the aforementioned type wherein the outside diameter of the tubular plastic element is slightly greater than the outer diameter of the convolutions, the inside diameter of the tubular plastic element being slightly less than the inner diameter of the convolutions, and said one end portion being arranged in the form of a convolution substantially following the circumference of the adjacent convolution of the main body portion while simultaneously flaring axially outwardly at a rate greater than the spacing between the convolutions of the main body portion such that the terminal end thereof is spaced from the corresponding point on the adjacent convolution of the main body portion a distance which is substantially greater than the pitch between the convolutions of the main body portion, the space between the convolutions permitting the main body portion to yield longitudinally.

Still another object of the present invention is to provide a quick release mounting device, such as the elongated expansible resilient fastener just described, for connecting a license plate to an automobile bumper.

It is thus another object of the present invention to provide a simplified low-cost structure of the aforementioned type having certain advantages contributing to efficiency, reliability, and long life, as well as ease of maintenance.

Further objects and advantages of the present invention will be apparent from the following description, reference being had to the accompanying drawing wherein a preferred form of the present invention is clearly shown.

FIGURE 1 is a side elevation of the screw-spring holder.

FIGURE 2 is an end view looking in the direction of arrows 2—2 of FIGURE 1.

FIGURE 3 is a perspective view of the screw-spring holder.

FIGURE 4 is a vertical sectional view through a bumper and license plate illustrating the manner in which the pilot end of the screw-spring holder is inserted into the aligned holes provided in the bumper and license plate.

FIGURE 5 is a view similar to FIGURE 4, illustrating the manner in which the screw-spring holder is threaded into the aligned openings to firmly hold the license plate against the bumper.

FIGURE 6 is a partial front elevation looking in the direction of arrow 6 of FIGURE 5.

FIGURE 7 illustrates the manner in which a screw-spring holder may be utilized to connect a pair of movable flaps on a display sign and the display sign hung by means of ropes or the like.

FIGURE 8 is a screw similar to FIGURE 5 illustrating another embodiment of the present invention having a plastic tubular cover on the head of the screw-spring holder.

FIGURE 9 is a right-hand end screw-spring holder, illustrated in FIGURE 8, removed from the bumper and license plate.

FIGURE 10 is a perspective view of still another embodiment of the present invention.

FIGURE 11 is an end view looking in the direction of arrows 11—11 of FIGURE 10.

FIGURE 12 is a perspective view of a further embodiment of the present invention.

FIGURE 13 is a view, partly in section, taken on line 13—13 of FIGURE 12.

Referring now more particularly to the drawing in which similar referene characters identify similar parts in the several views, numeral 10 designates a dealer's license plate having a pair of conventional elongated slots 12 therein. The license plate 10 is adapted to be connected to an automobile bumper 14 by means of a pair of screw-spring holders 16. The bumper 14 is provided with a pair of laterally spaced round holes 18 which are in alignment with the slots 12 provided in the license plate 10. The round holes 18 each have a diameter in the approximate range of ³⁄₁₆" to ¼". The holes are usually not threaded. The screw-spring holders 16 are designed to hold the license plate 10 firmly in place with respect to the bumper 14 and are capable of withstanding road vibrations. It has been found that while generally two screw-spring holders 16 are utilized in mounting a plate 10, one screw spring holder 16 may be utilized successfully where the plate 10 is mounted on the bumper 14 for a relatively short period.

The wire forming the screw-spring holder 16 is wound or coiled about an axis 22 to provide a plurality of interconnected convolutions 24, 26, and 28. The convolutions have substantially equal diameters as illustrated. The leading end of the screw-spring holder 16 integral with the convolution 24 forms a pilot portion 30 which is flared outwardly, as an example ⁷⁄₁₆", for facilitating the entry of the spring holder 16 into the aligned holes 12 and 18. The terminal part 31 of the pilot portion 30 is substantially flat.

The trailing end of the screw-spring 16 is provided with a head 32 which is integral with the convolutions 28 and is constructed and arranged to lie in a central plane, containing the axis 22 of the screw-spring holder 16.

The screw-spring holder 16 has approximately three and one-half convolutions including the leading end which forms the pilot portion 30. The pitch of the screw-spring holder 16 is substantially equal although it has been found that the pitch may vary between convolutions. In such a case the pitch constantly decreases from the leading end of the screw-spring holder 16 to the trailing end thereof. The pitch is determined by the thickness of the parts, members, or elements to be clamped.

Thus, considering in the broadest sense the license plate 10 and the bumper 14 as being a pair of adjacent plates of given combined thickness, and the equivalent of other similarly associated plate pairs of possibly different specific materials and/or uses, each convolution of the helical body portion of the spring holder will be spaced from an adjacent convolution, along the body portion axis, a distance substantially equal to but less than the sum of the thicknesses of the two plates.

Some bumpers on present modern automobiles have an irregular contour so that it is impossible to place a license plate against the bumper, align the holes, and insert the screw-spring holder 16. In such a case, the screw-spring holder 16 is initially screwed or threaded into the license plate 10 a short distance and the leading end of the screw-spring holder subsequently aligned with the hole provided in the bumper. Later the screw-spring holder 16 is rotated to firmly connect the license plate 10 to the bumper 14.

The screw-spring holder 16 as illustrated is made from steel wire of substantially circular cross-section. The size or diameter of the wire is determined by the required clamping force and by the thickness of the members, elements, or the like to be clamped. As an example, it has been found that spring steel wire having a diameter of .080" is ideal. The wire is cadmium chrome plated so as to withstand rust. The screw-spring holder 16 has an overall axial length of approximately 1½", measured from the flare 30 to the top of the head 32 and has an outside diameter of approximately ²⁵⁄₃₂". The loop or head 32 has an outside diameter of ⅞" and thus has an outside diameter which is slightly large or greater than the outside diameter of the convolutions 24, 26 and 28. The terminal part 31 of the pilot portion or flare 30 is spaced lengthwise from the convolution 24 along the line indicated by the letter "F" in FIGURE 1 in an amount equal to approximately ⁷⁄₁₆".

In operation, the operator grips the screw-spring holder 16 by the handle or head 32. Initially, the holes provided in the bumper 14 and license plate 10 are aligned and subsequently the flare or pilot portion 30 of the screw-spring holder 16 is inserted through the holes 12 and 18, as illustrated in FIGURE 3, and the head 32 rotated so as to thread the screw-spring holder 16 into the holes 12 and 18. The screw-spring holder 16 is threaded from the position indicated in FIGURE 4 to the position indicated in FIGURE 5 where convolutions 26 and 28 resiliently bias the plate 10 against the bumper 14. The axial distance between convolutions 26 and 28, when in the assembled position illustrated in FIGURE 5, is larger than the pitch distance between the convolutions 26 and 28 when in the position indicated in FIGURE 4. The screw-spring holder 16, which is resilient, yieldably urges the plate 10 firmly against the bumper 14 into a predetermined fixed position.

In many instances it has been found that only one screw-spring holder 16 is required. However, certain automobile agencies would prefer to utilize two screw-spring holders 16 for mounting each license plate 10. When it is required to remove the license plate 10 from the bumper 14, all that is required is that the operator grips the head 32 and rotates the screw-spring 16 in the opposite direction to the position indicated in FIGURE 4. The screw-spring holded 16 provides a positive acting clamping device which may be installed and removed with considerable ease and in a minimum amount of time.

From the above description it will be seen that there has been provided a simple device for rapidly and conveniently attaching license plates or other movable members to a bumper or other supporting member. Not only is the license plate held firmly in position, but it is prevented from vibrating and rattling due to the pressure of the screw-spring holder 16. The use of the screw-spring holder of the type just described does not require any tools.

My invention may be utilized not only as a license plate retainer, but also as a placard retainer, display retainer, or the like. FIGURE 7 illustrates a display sign 40 of rectangular configuration. The four upper edges of the display sign 40 are each provided with an inwardly turned, movable flap 42. Adjacent corners of the flap 42 contact each other. In order to support the display sign 40, all that is required is that screw-spring holders 44 of the type previously described are threaded into the flaps 42 at the corners, so that the adjacent convolutions resiliently bias the adjacent flaps 42 together. After the screw-spring holders 44 have been placed at each corner, the display sign 40 is hung from the ceiling by means of cords, ropes, or the like 46, which are fastened to the heads of the screw-spring holders 44 on one end thereof and to the ceiling on the other end thereof.

While I have described utilizing four holders 44 for supporting the display sign 40, it should be understood that one or any number of spring holders may be utilized. The display sign 40 may be made of cardboard, heavy paper, or other similar materials. It is also contemplated that even lightweight metals may be utilized for the display sign.

It is also contemplated that the four flaps 42 be constructed and arranged so that they may overlie one another. A screw-spring holder 44 which is centrally located with respect to the axis of the display sign 40 is inserted through the four flaps so as to firmly hold the flaps together. The display sign is suspended by a single cord, rope, or the like.

FIGURES 8 and 9 show another embodiment of the present invention, wherein the screw-spring holder 16 is constructed and designed according to the specification for the embodiment illustrated in FIGURES 1 and 2. In order to facilitate the turning of the screw-spring holder 16, the head 32 is provided with a yieldable plastic element or cover 50. The plastic element or cover 50 is formed from tubular plastic material, such as vinyl. The element 50 has a relatively heavy wall thickness. The handle 32 is provided with a terminal extremity spaced axially from the convolution 28 nearest the handle. The aforesaid terminal extremity is curved towards the longitudinal axis of the fastener; and the length of the plastic element is such, in relation to the length of configuration of handle 32, as to permit the tubular plastic element 50 to be sleeved on the handle 32 without flexing the handle under a force sufficient to urge the leading end of the plastic element 50 into pressure engagement with convolution 28 and to thereafter urge the trailing end of the element 50 against the convolution 28 to lock the element 50 on the handle 32 thereby preventing lengthwise movement of the plastic element on the handle 32.

With such a construction the end walls or surfaces of the tubular plastic element 50 abut the convolution 28 in two places to prevent lengthwise movement of the plastic element 50 on the metal handle 32 as best illustrated in FIGURE 8. The element 50 has a length slightly greater than the length of the wire forming the head 32. The element 50 provides a yieldable cushion for a person attaching or removing the holder 16. The element 50 when mounted on handle 32 is of semi-circular configuration, with the outside diameter of the plastic element 50 being slightly greater than the outside diameter of the convolutions 24, 26 and 28, and with the inside diameter of the plastic element 50 being slightly less than the inside diameter of the aforesaid convolutions to permit the insertion of a finger therethrough. The element 50 during assembly is initially moved through the interior of the holder 16 generally parallel to the longitudinal axis thereof and thereafter sleeved over the handle 32 as just described.

FIGURES 10 and 11 illustrate another type of screw-spring holder which is designated by the numeral 52. The screw-spring holder 52 differs from the holder 16, illustrated in FIGURE 3, in the type of head employed. The screw-spring holder 52 includes convolutions 54, 56, and 58, and a pilot or flared end 60 arranged in the same manner as the corresponding portion in FIGURE 3.

The head end of the holder 52 includes a portion 62 forming part of a convolution. The portion 62 abruptly changes direction, as indicated at 64, and extends outwardly therefrom in the form of an arm 66. The arm 66 extends laterally across the space between the convolutions and is slightly curved as best illustrated in FIGURE 11.

When in use, the screw-spring holder 52 is threaded into the openings of a pair of elements to a position where the arm 66, which is resilient, is in surface-to-surface contact with the front element, such as a license plate, to hold the elements firmly together.

In certain instances, it may be required to utilize a tool, such as pliers or the like, to complete the threading of the holder 52 or to begin the removal of the holder 52 from its support. This is due to the fact that it is difficult at times to grip the arm 66 by the hand when the arm 66 is close to the license plate or other element.

FIGURES 12 and 13 illustrate another embodiment of the screw-spring holder 52 wherein an annular cup-shaped cover 70, made from a plastic material such as vinyl, is mounted on the arm 66 in a fixed position. The cover 70 includes means for anchoring the arm 66 permanently therein. The plastic cover 70 is provided with an elongated slot 72 for a screw driver or the like for facilitating the attaching or removing of the screw-spring holder 52 to or from the support respectively, if required. In most applications the cover 70 provides a convenient handle for attaching and removing the holder 52 by hand.

The embodiments illustrated in FIGURES 10–13 have the same specifications as described for the other embodiments, with the exception that the head portion 62 is much smaller than head 32 thereby reducing the overall length of the holder 52. As an example, the holder 52 may have a length of approximately 1″. The cover 70 may have an outside diameter of approximately 1″.

The various screw-spring holders illustrated herein are not only adapted for securing license plates to bumpers but also are adapted for holding display cards and display material. The holders are easy to utilize by just twisting them on or off.

The holders are designed to firmly hold a pair of elements together and are attractive due to the use of cadmium chrome plated spring steel wire.

The drawing and the foregoing specification constitute a description of the improved screw-spring in such full, clear, concise, and exact terms as to enable any person skilled in the art to practice the invention, the scope of which is indicated by the appended claim.

What I claim as my invention is:

An elongated expansible resilient fastener adapted to pass through preformed openings in adjacent plates to retain said plates in assembled relation, comprising a length of metal wire of circular cross-section, said wire having a main body portion wound in helical form to provide a plurality of connected convolutions, each convolution being spaced from the adjacent convolution along the axis of said body portion a distance substantially equal to but less than the sum of the thicknesses of said plates, and a pair of opposed end portions at the terminal points of said main body portion, one of said end portions providing a guide for threading the fastener into said openings and the other of said end portions providing a handle of semi-circular configuration which lies in a plane containing the longitudinal axis of the fastener, said handle providing means for readily turning the fastener, an elongated tubular plastic element surrounding said handle end portion to provide a yieldable cover on said handle, said element being of semi-circular configuration, said handle having a terminal extremity spaced axially from the convolution nearest said handle and curving towards the longitudinal axis of the fastener and said plastic element being of such a length in relation to the length of the handle configuration as to permit said plastic element to be sleeved on said handle without flexing said handle under a force sufficient to urge the leading end of said plastic element into pressure engagement with the convolution closest to said handle and to thereafter urge the trailing end of said plastic element against the convolution closest to said handle to lock the plastic element on said handle thereby preventing lengthwise movement of said plastic element on said handle, the outside diameter of said handle and tubular plastic element when sleeved on said handle being slightly greater than the outer diameter of said convolutions, the inside diameter of said handle and tubular plastic element when sleeved on said handle being slightly less than the inner diameter of said convolutions, and said one end portion being arranged in the form of a convolution substantially following the circumference of the adjacent convolution of the main body portion while simultaneously flaring axially outwardly at a rate greater than the spacing between the convolutions of said main body portion such that the terminal end thereof is spaced from the corresponding point on the adjacent convolution of said main body portion a distance which is substantially greater than the pitch between the convolutions of said main body portion, the space between said convolutions permitting said main body portion to yield longitudinally.

References Cited by the Examiner

UNITED STATES PATENTS

| | | | |
|---|---|---|---|
| 72,013 | 12/1867 | Gardner | 85—53 |
| 1,005,780 | 10/1911 | Raber | 85—1 |
| 2,756,848 | 7/1956 | Hillegass | 85—1 |
| 2,865,609 | 12/1958 | Steiner | 85—41 |
| 3,065,660 | 11/1962 | Puterbaugh | 85—5 |
| 3,170,270 | 2/1965 | Sparber et al. | 85—1 |

EDWARD C. ALLEN, *Primary Examiner.*

R. S. BRITTS, *Assistant Examiner.*